United States Patent
Koskan

(10) Patent No.: US 8,416,724 B2
(45) Date of Patent: Apr. 9, 2013

(54) DYNAMIC SELECTION OF CHANNEL ASSIGNMENT FOR PRESERVING POWER IN A WIRELESS DEVICE

(75) Inventor: Patrick D. Koskan, Lake Worth, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1018 days.

(21) Appl. No.: 11/773,092

(22) Filed: Jul. 3, 2007

(65) Prior Publication Data

US 2009/0010274 A1 Jan. 8, 2009

(51) Int. Cl.
*G08C 17/00* (2006.01)

(52) U.S. Cl. ........ 370/311; 370/318; 370/329; 370/437; 455/13.4; 455/62; 455/127.5; 455/343.5; 455/450; 455/509; 455/574

(58) Field of Classification Search .................. 370/329, 370/332, 311, 318, 437; 455/450, 452.2, 455/509, 513, 62, 574, 127.5, 343.5, 13.4
See application file for complete search history.

(56) References Cited

U.S. PATENT DOCUMENTS

| | | | |
|---|---|---|---|
| 5,699,356 A | 12/1997 | Beever et al. | |
| 5,974,327 A * | 10/1999 | Agrawal et al. | ............ 455/452.2 |
| 6,108,321 A | 8/2000 | Anderson et al. | |
| 6,408,172 B1 * | 6/2002 | Alperovich et al. | ........ 455/404.1 |
| 2004/0266393 A1 | 12/2004 | Zhao et al. | |
| 2006/0067278 A1 * | 3/2006 | Li et al. | ........................ 370/335 |
| 2006/0079268 A1 * | 4/2006 | Livet et al. | .................... 455/522 |
| 2006/0139099 A1 * | 6/2006 | Osborn | ........................ 330/289 |
| 2007/0224951 A1 * | 9/2007 | Gilb et al. | ................. 455/127.5 |
| 2008/0212525 A1 * | 9/2008 | Tervonen et al. | ............. 370/329 |

OTHER PUBLICATIONS

Mikkonen et al., Wireless ATM MAC performance evaluation, a case study—HIPERLAN type 1 vs. modified MDR, 1998, Mobile Networks and Applications 3 (1998), p. 247-259.*

* cited by examiner

*Primary Examiner* — Hoon J Chung
(74) *Attorney, Agent, or Firm* — Barbara R. Doutre

(57) ABSTRACT

A method, information processing system, and wireless communication system for dynamically assigning a communication channel to a wireless device. A request for a communication channel from a wireless device (108) is received. At least a current-drain profile (120) associated with the wireless device (108) is analyzed. The current-drain profile (120) indicates power consumption associated with the wireless device (108) for a plurality of channel frequency bands. A plurality of communication channels is analyzed with respect to the current-drain profile (120). A communication channel is selected from the plurality of communicating channels in response to the analyzing at least the current-drain profile (120). A communication channel assignment comprising the communication channel that has been selected is transmitted to the wireless device (108) in response to the selecting.

26 Claims, 4 Drawing Sheets

DYNAMIC SELECTION OF CHANNEL ASSIGNMENT FOR PRESERVING POWER IN A WIRELESS DEVICE

FIELD OF THE INVENTION

The present invention generally relates to the field of wireless communications, and more particularly relates to preserving battery life of a wireless device.

BACKGROUND OF THE INVENTION

Battery life of wireless devices has always presented problems for wireless device manufacturers and wireless system operators. Current wireless systems, which can utilize two way radios and/or other mobile devices, comprise a network controller which assigns a device a voice or data channel grant. This assignment can be based on available channel frequency bands in the system that are not being used. When a wireless device communicates with another party, the device switches from a control channel connection to a voice or data channel assigned to it by the network controller. The channel grant is almost always arbitrarily assigned based on the network controller's channel assignment module output. This output is usually determined by available channel frequency bands or adjacent channel usage, but never accounts for the mobile radio's needs or requirements to operate as efficiently as possible.

Therefore a need exists to overcome the problems with the prior art as discussed above.

SUMMARY OF THE INVENTION

Briefly, in accordance with the present invention, disclosed are a method, information processing system, and wireless communication system for dynamically assigning a communication channel to a wireless device. A request for a communication channel from a wireless device is received. At least a current-drain profile associated with the wireless device is analyzed. The current-drain profile indicates power consumption associated with the wireless device for a plurality of channel frequency bands. A plurality of communication channels is analyzed with respect to the current-drain profile. A communication channel is selected from the plurality of communicating channels in response to the analyzing at least the current-drain profile. A communication channel assignment comprising the communication channel that has been selected is transmitted to the wireless device in response to the selecting.

In another embodiment, an information processing system dynamically assigns a communication channel to a wireless device. The information processing system includes a memory and a processor that is communicatively coupled to the memory. The information processing system also includes a network controller that is communicatively coupled to the memory and the processor. The network controller is adapted to receiving a request for a communication channel from a wireless device. At least a current-drain profile associated with the wireless device is analyzed. The current-drain profile indicates power consumption associated with the wireless device for a plurality of channel frequency bands. A plurality of communication channels is analyzed with respect to the current-drain profile. A communication channel is selected from the plurality of communicating channels in response to the analyzing at least the current-drain profile. A communication channel assignment comprising the communication channel that has been selected is transmitted to the wireless device in response to the selecting.

In yet another embodiment, a wireless communication system is disclosed. The wireless communication system includes a plurality of base stations and a plurality of wireless devices. Each wireless device is communicatively coupled to at least one base station in the plurality of base stations. The wireless communication system also includes at least one information processing system that is communicatively coupled to at least one base station in the plurality of base stations. The information processing system includes a memory and a processor that is communicatively coupled to the memory. The information processing system also includes a network controller that is communicatively coupled to the memory and the processor. The network controller is adapted to receiving a request for a communication channel from a wireless device. At least a current-drain profile associated with the wireless device is analyzed. The current-drain profile indicates power consumption associated with the wireless device for a plurality of channel frequency bands. A plurality of communication channels is analyzed with respect to the current-drain profile. A communication channel is selected from the plurality of communicating channels in response to the analyzing at least the current-drain profile. A communication channel assignment comprising the communication channel that has been selected is transmitted to the wireless device in response to the selecting.

An advantage of the foregoing embodiments of the present invention is that a network controller can dynamically assign a communication channel to a wireless device that preserves power consumption at the device. The network controller can analyze current-drain information, telemetry data, and the like that is associated with a device and determine which communication channels help preserve the most power at the wireless device.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term "wireless device" is intended to broadly cover many different types of devices that can wirelessly receive signals, and optionally can wirelessly transmit signals, and may also operate in a wireless communication system. For example, and not for any limitation, a wireless communication device can include any one or a combination of the following: a two-way radio, a cellular telephone, a mobile phone, a smartphone, a two-way pager, a wireless messaging device, a laptop/computer, automotive gateway, residential gateway, and the like.

Wireless Communication System

Figure 1:
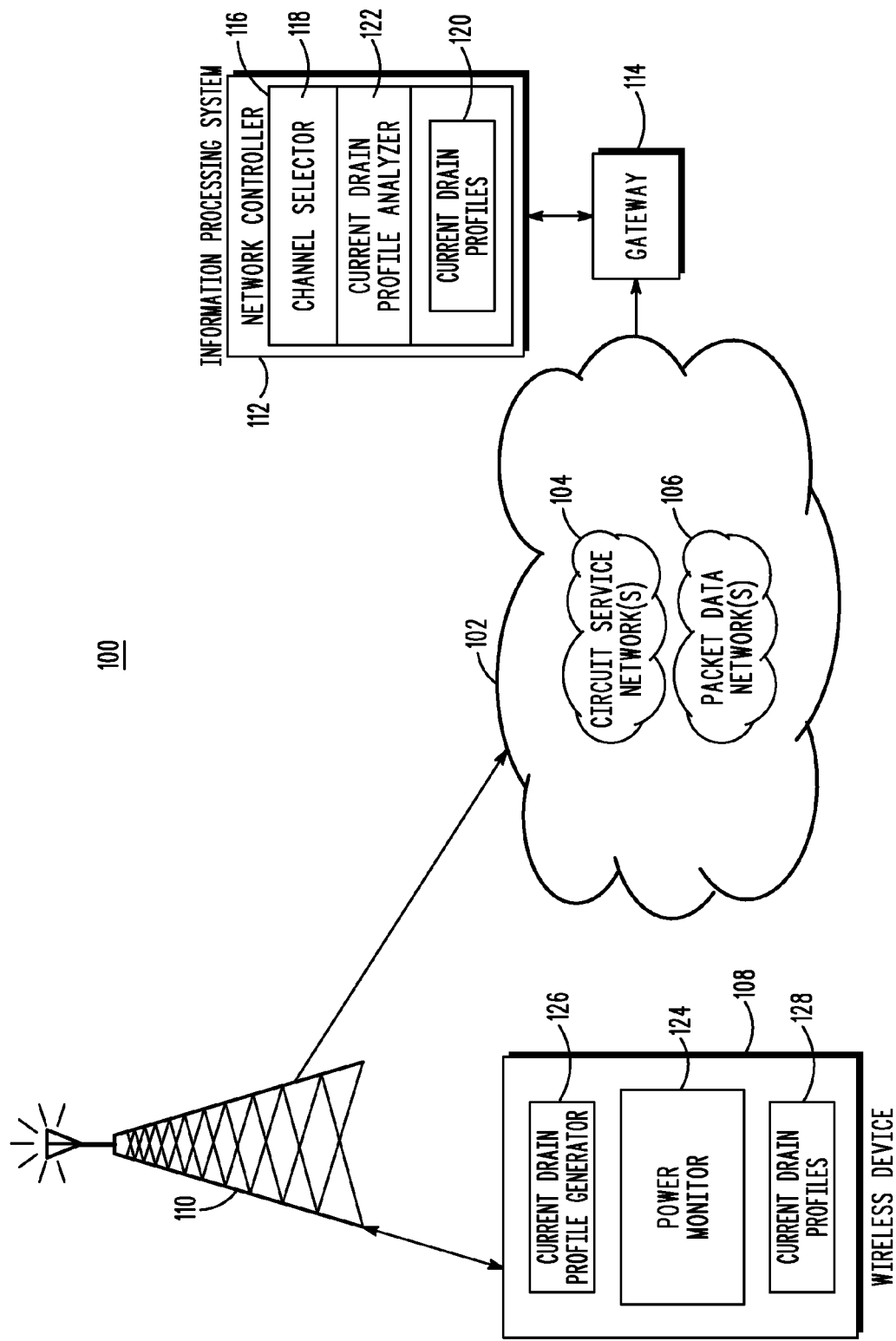
FIG. 1 is block diagram illustrating a wireless communication system, according to an embodiment of the present invention.

According to an embodiment of the present invention as shown in FIG. 1 a wireless communication system 100 is illustrated. FIG. 1 shows a wireless communication network 102 comprising one or more access networks such as a circuit service network 104 and/or a packet data network 106. In one embodiment, the packet data network 106 is an IP or SIP based connectivity network, which provides data connections at much higher transfer rates than a traditional circuit services network. A packet data network 106 can comprise an Evolution Data Only ("EV-DO") network, a General Packet Radio Service ("GPRS") network, a Universal Mobile Telecommunications System ("UMTS") network, an 802.11 network, an 802.16 (WiMax) network, Ethernet connectivity, dial-up modem connectivity, or the like. A circuit services network 104 provides, among other things, voice services to the wireless device 108. It should be noted that access networks 104, 106 also include additional components (not shown) such as controllers, transport/interconnect gear, network management modules, and the like that should be known to those of ordinary skill in the art.

The communications standard of the access networks 104, 106 can comprise Code Division Multiple Access (CDMA), Time Division Multiple Access (TDMA), Global System for Mobile Communications (GSM), General Packet Radio Service (GPRS), Frequency Division Multiple Access (FDMA), other IEEE 802.16 standards, Orthogonal Frequency Division Multiplexing (OFDM), Orthogonal Frequency Division Multiple Access (OFDMA), Wireless LAN (WLAN), WiMax or the like. Other applicable communications standards include those used for Public Safety Communication Networks including Project 25 ("P25") or TErrestrial TRunked rAdio (TETRA).

The wireless communication system 100 supports any number of wireless devices 108 which can be single mode or multi-mode devices. Multi-mode devices are capable of communicating over multiple access networks with varying technologies. For example, a multi-mode device can communicate over the access networks 104, 106 using various services such as Push-To-Talk ("PTT"), Push-To-Talk Over Cellular ("PoC"), multimedia messaging, web browsing, VoIP, multimedia streaming, and the like.

The wireless communication system 100 also includes one or more base stations 110 that are communicatively coupled to the wireless communication network 102. One or more information processing systems 112 such as a central server are communicatively coupled to the wireless communication network 102 via a gateway 114. The information processing system 112, in one embodiment comprises a network controller 116. The network controller 116, in one embodiment, includes a channel selector 118, current-drain profiles 120, and a current-drain profile analyzer 122. The channel selector 118 dynamically assigns a communication channel to a wireless device 108 that allows the wireless device 108 to consume less power.

In one embodiment, the channel selector 118 analyzes a current-drain profile 120 for a particular wireless device 108 or wireless device type. In this embodiment, the current-drain profile 120 indicates a current-drain value associated with the wireless device 108 for particular channel frequency bands or channels. For example, the current-drain profile 120 can indicate that a particular wireless device 108 or device type consumes less power on a specific frequency/channel than on another frequency/channel. Therefore, the channel selector 118 analyzes the current-drain profiles 120 via the current-drain profile analyzer 122 to dynamically select a communication channel for the wireless device 108 that allows the device to conserve power. The network controller 116 can also include telemetry data associated with a wireless device 108 such as temperature voltage, and the like.

It should be noted that although the channel selector 118, current-drain profiles 120, and the current-drain profile analyzer 122 are shown as part of the network controller 116, one or more of these components can reside separate from the controller 116. The current-drain profiles 120 can also reside at a remote information processing system. Alternatively, the current-drain profiles 120 can indicate current-drain information for different radio bands. Therefore, the network controller 116 can also dynamically select a base station 110 from a plurality of base stations and assign that base station to a wireless device 108 to reduce power consumption at the wireless device 108.

In another embodiment, the wireless device 108 comprises a power monitor 124 that monitors current-drain during communications. The power monitor 124 records and stores current-drain information associated with communication channels, or channel frequency bands, used by the wireless device 108. A current-drain profile generator 126 uses this stored information to generate one or more current-drain profiles 128. The current-drain profiles 128 enable the wireless device 108 to determine which communication channels, or channel frequency bands, require the most power and the least power. The wireless device 108 can then communicate a preferred list of communication channels, or channel frequency bands, to the network controller 116.

The network controller 116 assigns one of the preferred channels, or channel frequency bands, to the wireless device 108 if it is available. Alternatively, the current-drain profiles 128 and telemetry data can be transmitted to the network controller 116 if the controller 116 does not include a profile for the device 108 or device type. The network controller 116 uses the received profile 128 to dynamically select a communication channel/frequency as discussed above. The wireless device 108 can also transmit battery life information to the network controller 118. For example, the wireless device 108 can transmit its remaining battery life to the network controller 118. The network controller 118 can use the information to dynamically select a communication channel/frequency for the wireless device 108. For example, a wireless device 108 comprising low battery life can be assigned a communication link that helps preserve the most battery life. A wireless device 108 comprising a high level of battery life can be assigned a communication link that preserves less battery life.

Dynamic Selection of Communication Channels

The following is a more detailed discussion of the dynamic selection of communication channels, or channel frequency bands, performed by the network controller 116. Current wireless devices are not homogeneous with respect to the amount of current-drain required to operate the device in similar modes of operation, especially devices that are required to cover large bandwidths of operation. This is mainly due to component efficiencies over RF frequencies, voltages, and temperatures. Next generation devices are expected to cover not only traditional bandwidths (VHF or UHF), but also extended bandwidths and even multiple operating bands, as in the case of Software Defined Radio architectures (i.e. radios covering channel frequency bands from 100 MHz to 5 GHz). The next generation devices also suffer from non-homogenous nature. These requirements put a large strain on the device complexities, which in turn make it extremely difficult for the device designs to operate homogeneously across all modalities.

Therefore, the present invention utilizes a current-drain profile 120 of a wireless device 108 across these different modalities and enables the network controller 116 to intelligently and dynamically reassign a voice channel for the wireless device 108 to maximize its battery life. A current-drain profile associated with a wireless device 108 can be stored within a database 120 communicatively coupled to the network controller 116 by ID, by radio type assuming CpK regularities, and the like.

Alternatively, a current-drain profile 120 can be sent to the Network Controller 116 by the device 108 over a control channel, a data channel upon initialization, or the like. The profile 120 can comprise a current-drain vs. mode matrix; an intelligent subset that can represent best case to worse case current-drain modes using a single numbering system; or the like. As discussed above, the wireless device 108 can transmit battery life information to the network controller 116. Examples of current-drain data that can be included within a current-drain profile 120, 128 are given below in Table 1 to Table 3. It should be noted that these Tables and the data within the Tables are only used as examples and do not limit the present invention in any way. The Tables are used to illustrate how current-drains can vary from frequency to frequency and channel to channel. The Tables also show how current-drain values can differ based on telemetry data such as operating temperature.

Table 1 shows current values when for a wireless device 108 in a standby mode. Table 2 shows current values when the wireless device 108 is in a receiving mode. Table 3 shows current values when the wireless device 108 is in a transmitting mode.

TABLE 1

| STANDBY CURRENT (mA) | | | | | | |
|---|---|---|---|---|---|---|
| | Test Channel #1 Rx Freq: 851.100 Tx Freq: 806.100 | | | Test Channel #3 Rx Freq: 868.100 Tx Freq: 868.100 | | |
| | −30° C. | 25° C. | 60° C. | −30° C. | 25° C. | 60° C. |
| 6.0 V | 93.0 | 95.0 | 97.0 | 93.7 | 96.0 | 98.0 |
| 7.5 V | 86.0 | 87.2 | 89.0 | 86.0 | 88.6 | 90.0 |
| 9.0 V | 81.0 | 81.0 | 82.0 | 81.0 | 82.9 | 84.0 |

TABLE 2

| RECEIVE CURRENT (mA) | | | | | | |
|---|---|---|---|---|---|---|
| | Test Channel #1 Rx Freq: 851.100 Tx Freq: 806.100 | | | Test Channel #3 Rx Freq: 868.100 Tx Freq: 868.100 | | |
| | −30° C. | 25° C. | 60° C. | −30° C. | 25° C. | 60° C. |
| 6.0 V | 308.0 | 306.0 | 308.0 | 307.5 | 308.0 | 308.0 |
| 7.5 V | 283.0 | 284.0 | 284.0 | 288.0 | 285.0 | 287.0 |
| 9.0 V | 270.0 | 266.0 | 268.0 | 271.0 | 266.0 | 269.0 |

TABLE 3

| TRANSMIT CURRENT (mA) | | | | | | |
|---|---|---|---|---|---|---|
| | Test Channel #1 Rx Freq: 851.100 Tx Freq: 806.100 | | | Test Channel #3 Rx Freq: 868.100 Tx Freq: 868.100 | | |
| | −30° C. | 25° C. | 60° C. | −30° C. | 25° C. | 60° C. |
| 6.0 V | 1770.0 | 1810.0 | 1720.0 | 1490.0 | 1500.0 | 1480.0 |
| 7.5 V | 1720.0 | 1724.0 | 1750.0 | 1510.0 | 1506.0 | 1620.0 |
| 9.0 V | 1630.0 | 1630.0 | 1650.0 | 1320.0 | 1308.0 | 1360.0 |

As can be seen from the above Tables, large fluctuations in current-drain can occur based on voltage, temperature and frequency, especially in a transmit mode. Battery life for mobile wireless device in a voice mode is generally determined by individual use case. However, within the wireless industry battery life is generally quoted as the amount of time the battery operates the device when used for 10% of time talking (TX), 10% of the time receiving audio (RX), and 80% of the time in standby mode where the device is generally scanning the control channel. The battery life advertised usually takes into account the average current-drain for each mode at room temperature in the middle of the band of operation. Using the above Tables, a 10-10-80 battery life for this wireless device at Channel 1, room temp, and 7.5V using an 1800 mAhr battery source cab be calculated as 1800 mAhr/ [(0.10)(1724)+(0.10)(284)+(0.8)(87.2)]=6.7 hrs of battery life.

If the battery life was calculated at channel 3, −30 C, and 9V, the battery life is 1800 mAhr/[(0.10)(1320)+(0.10)(271)+ (0.8)(81)]=8.0 hrs of battery life. Therefore, a 1.3 hr battery life difference exists in the same wireless device operating on the same system but with a different modality. This is significant, even if the above is an extreme case. However, the above Tables are very useful for illustrating the varying operating current-drains of current wireless devices and future wireless devices. With the wave of multi-band SDR devices coming, the present invention is even more advantageous because future wireless device are likely to operate over greater frequency ranges.

Table 4 below shows another example of varying current-drains based on current at a user channel/frequency. In particular, Table 4 shows current-drain data for a trunked mode of operation. It should be noted that the data within Table 4 is only used as an example and does not limit the present invention in any way. Table 4 shows current-drains measured at room temp and at 7.5V for a wireless device 108.

TABLE 4

| Freq (W) | Pout (W) | I (A) TX | I (mA) STDBY | I (mA) RX |
|---|---|---|---|---|
| 765 | 2.7 | 1.26 | 77.3 | 219 |
| 775 | 2.72 | 1.25 | 77.4 | 219 |
| 795 | 2.71 | 1.19 | NA | 219 |
| 805 | 2.71 | 1.15 | NA | 219 |
| 806 | 3.19 | 1.27 | NA | 219 |
| 821 | 3.19 | 1.20 | NA | 219 |
| 851 | 3.19 | 1.17 | 78.0 | 219 |
| 868 | 3.22 | 1.33 | 78.1 | 219 |

As can be seen, the transmit current-drain is different at each end of the trunked transmitter band (806-821 MHz) and differs by 70 mA. Using the same equations above, the battery calculation at 806 MHz TX is 800 mAhr/[(0.10)(1270)+(0.10)(219)+(0.8)(78.0)]=8.52 hrs of battery life. Now, the same calculation at 821 MHz transmit is 1800 mAhr/[(0.10)(1200)+(0.10)(219)+(0.8)(78.1)]=8.81 hrs of battery life. Therefore, a 3.4% increase in battery life can occur given a standard Oct. 10, 1980 duty cycle between operating at 821 MHz versus 806 MHz. This increase is not insignificant, many hours are spent by engineers trying to reduce current-drains of as little as 1 mA in ICs and discrete circuits to create the same or smaller battery life savings.

Battery life savings are greater for Data system usage where the Transmit duty can be significantly higher, especially if uploading data at high rates, such as hi content images, telemetry, video, and the like. At the same time, receive current is less since data modes do not utilize the high power consuming devices such as a loudspeaker. In data modes, effective duty cycles of 40/0/60, for example, can be seen. In this example, using the current-drain table above, a wireless device 108 operating in the trunked band can see a 5.6% battery life savings.

It should be noted that the present invention is also applicable to wireless devices operating in Wideband modalities (such as HPD, Flarion, Canopy, and the like), cellular modalities (CDMA, EVDO, GPRS, GSM, EDGE, TDMA, and the like), Broad Band modalities (MESHNETWORKS, WLAN, WIMAX, LTE, and the like).

Exemplary Wireless Device

Figure 2:
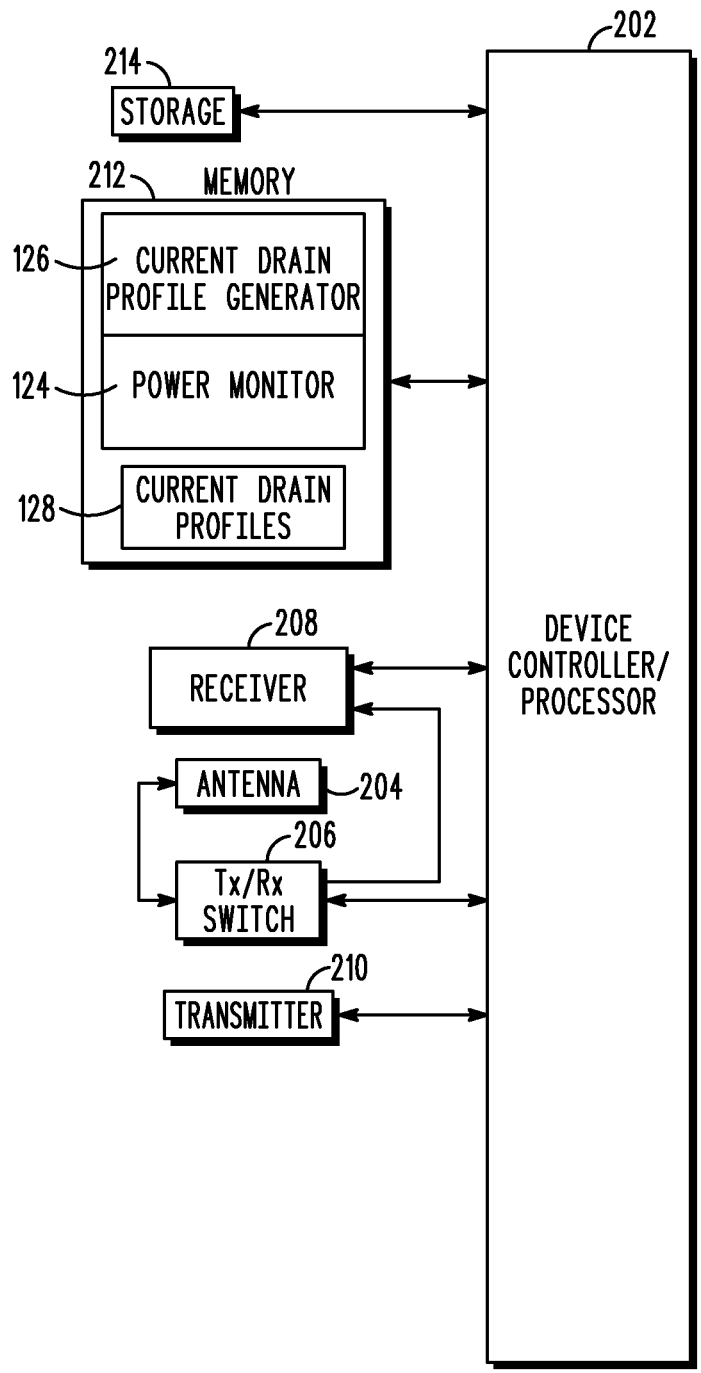
FIG. 2 is a block diagram illustrating a detailed view of a wireless device according to an embodiment of the present invention.

FIG. 2 is a block diagram illustrating a detailed view of the wireless device 108 according to an embodiment of the present invention. It is assumed that the reader is familiar with wireless communication devices. To simplify the present description, only that portion of a wireless communication device that is relevant to the present invention is discussed. The wireless device 108 operates under the control of a device controller/processor 202, that controls the sending and receiving of wireless communication signals. In receive mode, the device controller 202 electrically couples an antenna 204 through a transmit/receive switch 206 to a receiver 208. The receiver 208 decodes the received signals and provides those decoded signals to the device controller 202.

In transmit mode, the device controller 202 electrically couples the antenna 204, through the transmit/receive switch 206, to a transmitter 210. It should be noted that in one embodiment, the receiver 208 and the transmitter 210 are a dual mode receiver and a dual mode transmitter for receiving/transmitting over various access networks providing different air interface types. In another embodiment a separate receiver and transmitter is used for each of type of air interface.

The device controller 202 operates the transmitter and receiver according to instructions stored in the memory 212. These instructions include, for example, a neighbor cell measurement-scheduling algorithm. The memory 212, in one embodiment, includes the power monitor 124, current-drain profile generator 126, and current-drain profiles 128. The wireless device 108, also includes non-volatile storage memory 214 for storing, for example, an application waiting to be executed (not shown) on the wireless device 108.

Exemplary Information Processing System

Figure 3:
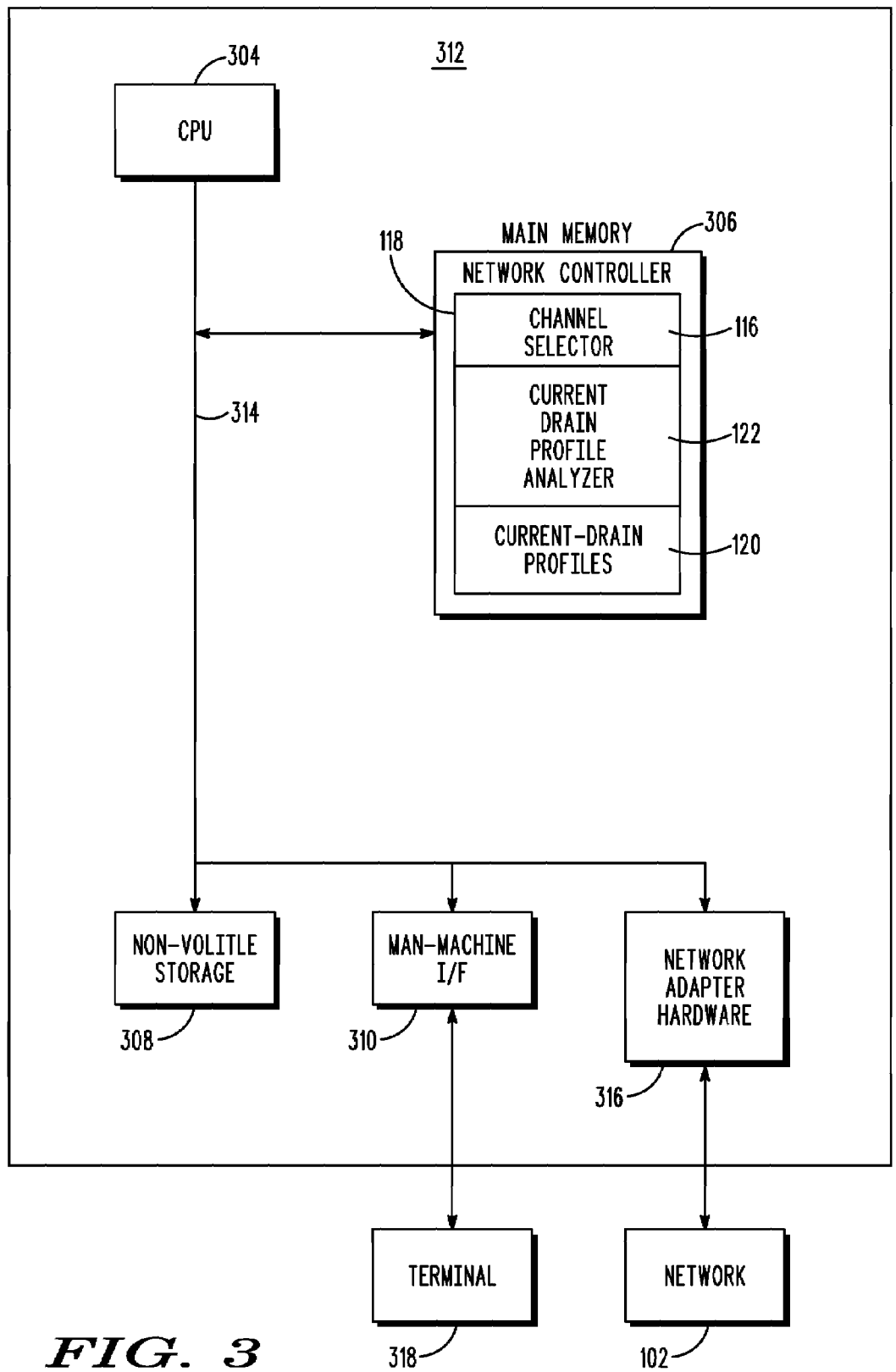
FIG. 3 is a block diagram illustrating a detailed view of a site controller according to an embodiment of the present invention.

FIG. 3 is a block diagram illustrating a more detailed view of an information processing system 312 such as the central server 112. The information processing system 312 is based upon a suitably configured processing system adapted to implement the embodiment of the present invention. For example, a personal computer, workstation, or the like, may be used. The information processing system 312 includes a computer 302. The computer 302 has a processor 304 that is connected to a main memory 306, non-volatile storage 308, a man-machine interface 310, and network adapter hardware 316. A system bus 314 interconnects these system components.

The main memory 306 includes the network controller 116, which includes the channel selector 118, current-drain profiles 120, and the current-drain profile analyzer 122. Although illustrated as concurrently resident in the main memory 306, it is clear that respective components of the main memory 306 are not required to be completely resident in the main memory 306 at all times or even at the same time. One or more of these components can be implemented as hardware.

The man-machine interface 310 allows technicians, administrators, and the like, to directly connect to the information processing system 312 via one or more terminals 318. The network adapter hardware 316 is used to provide an interface to the wireless communication network 102, a public network such as the Internet, and the like. Embodiments of the present invention are able to be adapted to work with any data communications connections including present day analog and/or digital techniques or via a future networking mechanism.

Process of Dynamically Assigning a Communication Channel

Figure 4:
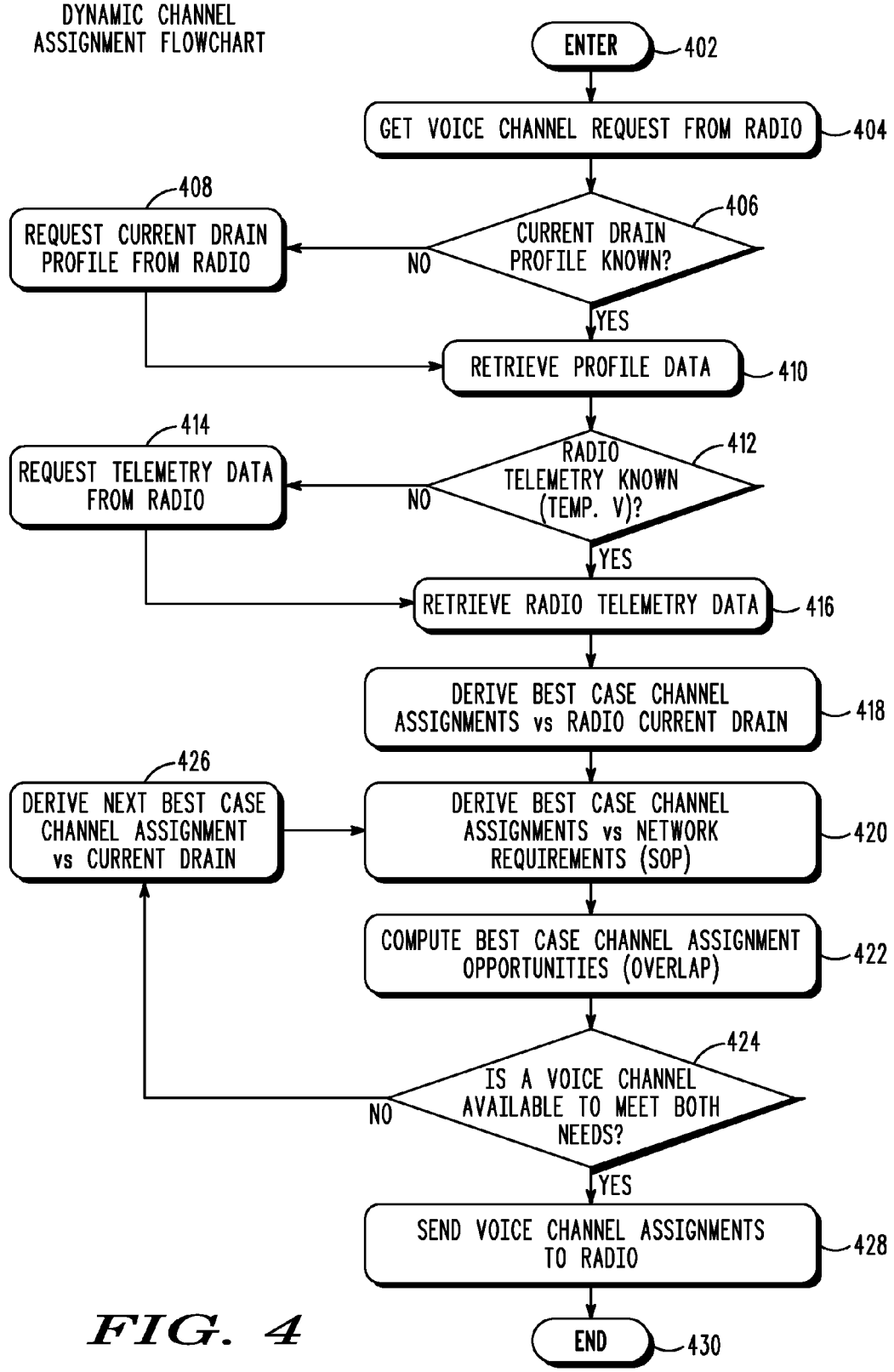
FIG. 4 is an operational flow diagram illustrating a process dynamically selecting a communication channel for a wireless device for preserving power consumption at the device according to an embodiment of the present invention.

FIG. 4 is an operational flow diagram illustrating a process of a base station initiating a handover scanning procedure on a wireless device. The operational flow diagram of FIG. 4 begins at step 402 and flows directly to step 404. The network controller 116, at step 404, receives a voice channel request from a wireless device 108. The network controller 116, at step 406, determines if a current-drain profile 120 exists for the requesting device 108 or device type of the requesting device 108. If the result of this determination is negative, the network controller 116, at step 408 requests current-drain profile information from the wireless device 108 and retrieves the profile data at step 410. If the result of this determination is positive, the network controller 116, at step 410, retrieves the profile data 120.

The network controller 116, at step 412, determines if radio telemetry information such as temperature, voltage, and the like are known. If the result of this determination is negative, the network controller 116, at step 414, requests telemetry data from the requesting device 108. The network controller 116, at step 416, retrieves the telemetry data. The network controller 116, at step 418, determines the best case channel assignments vs. device current-drain. In other words, the network controller 116 determines what the current-drain is for the requesting device 108 at each channel.

The network controller 116, at step 420, determines best case channel assignments vs. network requirements (SOP).

Network requirements may describe channels that are actually available for use such as channels not already assigned to other users or channels that are not down for maintenance, and the like. The network controller 116, at step 422, identifies the channel assignments that overlap between channel vs. current-drain and channel assignments vs. network opportunities. The network controller 116, at step 424, determines if a voice channel is available to meet both requirements of steps 420 and 422. If the result of this determination is negative, the network controller 116, at step 426, determines the next best case channel assignment vs. current drain and the control flows returns to step 420. If the result of this determination is positive, the network controller 116, at step 428, transmits the voice channel assignment to the requesting device 108. The control flow ends at step 430.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with an information processing system, for dynamic assignment of communication channels to a wireless device, the method comprising:
    receiving a request for a communication channel from the wireless device, the communication channel being defined by at least a channel frequency band;
    analyzing at least one current-drain profile associated with the wireless device, wherein the at least one current-drain profile indicates battery power consumption associated with the wireless device for a plurality of channel frequency bands;
    analyzing a plurality of communication channels with respect to the at least one current-drain profile;
    dynamically selecting, in response to the analyzing the at least one current-drain profile, a communication channel from the plurality of communication channels, such that in response to the wireless device comprising a high level of battery life, the dynamic selection shifts to a communication channel which preserves less battery life, and in response to the wireless device having a reduction in battery life, the dynamic selection shifts to a communication channel with a duty cycle that preserves most battery life, and wherein RF output power of the wireless device remains substantially constant throughout the dynamic channel assignment; and
    transmitting, in response to the dynamically selecting, a dynamic communication channel assignment, comprising the communication channel that has been selected, to the wireless device.

2. The method of claim 1, further comprising:
    requesting the at least one current-drain profile from the wireless device; and
    receiving, in response to the requesting the at least one current-drain profile, the at least one current-drain profile from the wireless device.

3. The method of claim 1, wherein the analyzing further comprises:
    analyzing telemetry data associated with the wireless device in addition to the at least one current-drain profile.

4. The method of claim 3, wherein the telemetry data comprises at least one of:
    an operating temperature of the wireless device; and
    an operating voltage of the wireless device.

5. The method of claim 1, wherein the dynamically selecting further comprises:
    selecting, in response to the analyzing the at least one current-drain profile, a base station from a plurality of base stations;
    dynamically assigning, in response to the selecting, the base station which has been selected, to the wireless device.

6. The method of claim 1, wherein the dynamically selecting further comprises:
    selecting a communication channel from the plurality of communication channels that preserves battery power consumption at the wireless device.

7. The method of claim 1, further comprising:
    receiving battery life information from the wireless device.

8. The method of claim 1, wherein the at least one current drain profile covers traditional bandwidths (VHF or UHF), extended bandwidths and multiple operating bands.

9. The method of claim 1, wherein the dynamic selection is not based on interference levels.

10. An information processing system for dynamic assignment of communication channels to a wireless device, the information processing system comprising:
    a memory;
    a processor communicatively coupled to the memory; and
    a network controller communicatively coupled to the memory and the processor, wherein the network controller is adapted to:
        receive a request for a communication channel from the wireless device, the communication channel being defined by at least a channel frequency band;
        analyze at least one current-drain profile associated with the wireless device, wherein the at least one current-drain profile indicates battery power consumption associated with the wireless device for a plurality of channel frequency bands;
        analyze a plurality of communication channels with respect to the at least one current-drain profile;
        dynamically select, in response to the analyzing the at least one current-drain profile, a communication channel from the plurality of communication channels, such that in response to the wireless device comprising a high level of battery life, the dynamic selection of the communication channel shifts to a channel which preserves less battery life, and in response to the wireless device having a reduction in battery life, the dynamic selection of the communication channel being shifted to a channel with a duty cycle that preserves most battery life, and wherein RF output power of the wireless device remains substantially constant throughout the dynamic channel assignment; and
        transmit, in response to the dynamic selection, a dynamic communication channel assignment, comprising the communication channel that has been selected, to the wireless device.

11. The information processing system of claim 10, wherein the network controller is further adapted to:
    request the at least one current-drain profile from the wireless device; and
    receive, in response to the requesting the at least one current-drain profile, the at least one current-drain profile from the wireless device.

12. The information processing system of claim 10, wherein the analyzing further comprises:
   analyzing telemetry data associated with the wireless device in addition to the at least one current-drain profile.

13. The information processing system of claim 12, wherein the telemetry data comprises at least one of:
   an operating temperature of the wireless device; and
   an operating voltage of the wireless device.

14. The information processing system of claim 10, wherein the dynamic selection further comprises:
   selecting, in response to the analyzing the at least one current-drain profile, a base station from a plurality of base stations;
   dynamically assigning, in response to the selecting, the base station which has been selected to the wireless device.

15. The information processing system of claim 10, wherein the dynamic selection further comprises:
   selecting a communication channel from the plurality of communication channels that preserves battery power consumption at the wireless device.

16. The information processing system of claim 10, wherein the network controller is further adapted to:
   receive battery life information from the wireless device.

17. The information processing system of claim 10, wherein the at least one current-drain profile allows the wireless device to operate homogeneously across two or more modalities.

18. The information processing system of claim 10, wherein the dynamic selection is not based on interference levels.

19. A wireless communication system comprising:
   a plurality of base stations;
   a plurality of wireless devices, wherein each wireless device is communicatively coupled to a base station in the plurality of base stations; and
   at least one information processing system communicatively coupled to at least one base station in the plurality of base stations, wherein the at least one information processing system comprises:
   a memory;
   a processor communicatively coupled to the memory; and
   a network controller communicatively coupled to the memory and the processor, wherein the network controller is adapted to:
      receive a request for a communication channel from a wireless device, the communication channel being defined by at least a channel frequency band;
      analyze at least one current-drain profile associated with the wireless device, wherein the at least one current-drain profile indicates battery power consumption associated with the wireless device for a plurality of channel frequency bands;
      analyze a plurality of communication channels with respect to the at least one current-drain profile;
      dynamically select, in response to the analyzing the at least one current-drain profile, a communication channel from the plurality of communication channels, wherein in response to the wireless device comprising a high level of battery life, the dynamic selection of the communication channel shifts to a channel which preserves less battery life, and in response to the wireless device having a reduction in battery life, the dynamic selection of the communication channel being shifted to a channel with a duty cycle that preserves most battery life, and wherein RF output power of the wireless device remains substantially constant throughout the dynamic channel assignment; and
      transmit, in response to the dynamic selection, a dynamic communication channel assignment, comprising the communication channel that has been selected, to the wireless device.

20. The wireless communication system of claim 19, wherein the network controller is further adapted to:
   request the at least one current-drain profile from the wireless device; and
   receive, in response to the requesting the at least one current-drain profile, the at least one current-drain profile from the wireless device.

21. The wireless communication system of claim 19, wherein the analyzing further comprises:
   analyzing telemetry data associated with the wireless device in addition to the at least one current-drain profile.

22. The wireless communication system of claim 21, wherein the telemetry data comprises at least one of:
   an operating temperature of the wireless device; and
   an operating voltage of the wireless device.

23. The wireless communication system of claim 19, wherein the dynamic selection further comprises:
   selecting, in response to the analyzing the at least one current-drain profile, a base station from a plurality of base stations;
   assigning, in response to the selecting, the base station which has been selected to the wireless device.

24. The wireless communication system of claim 19, wherein the dynamic selection further comprises:
   selecting a communication channel from the plurality of communication channels that preserves battery power consumption at the wireless device.

25. The wireless communication system of claim 19, wherein the at least one current-drain profile of the wireless device spans across different modalities.

26. The wireless communication system of claim 19 wherein the dynamic selection is not based on interference levels.

* * * * *